(12) United States Patent
Hioda (10) Patent No.: US 10,723,303 B2
(45) Date of Patent: Jul. 28, 2020

(54) VEHICLE CURTAIN AIRBAG DEVICE

(71) Applicant: TOYOTA JIDOSHA KABUSHIKI KAISHA, Toyota-shi, Aichi-ken (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/170,719

(22) Filed: Oct. 25, 2018

(65) Prior Publication Data

US 2019/0161047 A1 May 30, 2019

(30) Foreign Application Priority Data

Nov. 30, 2017 (JP) .................................. 2017-230585

(51) Int. Cl.
| | |
|---|---|
| *B60R 21/213* | (2011.01) |
| *B60R 21/232* | (2011.01) |
| *B60R 21/26* | (2011.01) |
| *B60R 21/215* | (2011.01) |
| *B60R 21/216* | (2011.01) |
| *B60R 13/02* | (2006.01) |
| *B60R 21/2338* | (2011.01) |

(52) U.S. Cl.
CPC .......... *B60R 21/213* (2013.01); *B60R 21/215* (2013.01); *B60R 21/216* (2013.01); *B60R 21/232* (2013.01); *B60R 21/26* (2013.01); *B60R 13/0212* (2013.01); *B60R 2021/23386* (2013.01)

(58) Field of Classification Search
CPC ... B60R 21/213; B60R 21/216; B60R 21/232; B60R 21/26; B60R 21/215; B60R 2021/23386; B60R 2021/2161
See application file for complete search history.

(56) References Cited

U.S. PATENT DOCUMENTS

| | | | | |
|---|---|---|---|---|
| 2002/0036395 | A1* | 3/2002 | Bakhsh | ................. B60R 21/232 |
| | | | | 280/730.2 |
| 2003/0218324 | A1* | 11/2003 | Ju | ........................... B60R 21/26 |
| | | | | 280/743.1 |

(Continued)

FOREIGN PATENT DOCUMENTS

| | | |
|---|---|---|
| JP | 2012-206573 A | 10/2012 |
| JP | 2015-140087 A | 8/2015 |

(Continued)

*Primary Examiner* — Frank B Vanaman
(74) *Attorney, Agent, or Firm* — Oliff PLC (57) ABSTRACT

A vehicle curtain airbag device includes: a main body stored between a front pillar and a front pillar garnish as well as between a roof side rail and a roof head lining; a notch portion formed at the main body, and dividing an upper portion of the main body into front and rear sides; a connecting component connecting a front inflating portion at a front side of the notch portion to a vehicle main body, and supporting the front inflating portion so as to inflate at a vehicle width direction outer side of the front pillar garnish; and a holding component holding the front pillar garnish such that the front pillar garnish is movable in the vehicle width direction between an initial position in a pre-inflated state of the main body, and an inflation position, the inflation position being at a vehicle width direction inner side relative to the initial position.

5 Claims, 5 Drawing Sheets

(56) References Cited

U.S. PATENT DOCUMENTS

| | | | |
|---|---|---|---|
| 2004/0119270 A1* | 6/2004 | Gu | B60R 21/232 |
| | | | 280/730.2 |
| 2004/0130128 A1* | 7/2004 | Bakhsh | B60R 21/232 |
| | | | 280/730.2 |
| 2011/0221172 A1* | 9/2011 | She | B29C 70/74 |
| | | | 280/730.2 |
| 2014/0217710 A1* | 8/2014 | Fukawatase | B60R 21/233 |
| | | | 280/730.2 |
| 2015/0145234 A1 | 5/2015 | Wang et al. | |
| 2016/0167614 A1* | 6/2016 | Inami | B60R 13/0206 |
| | | | 280/730.2 |
| 2017/0182967 A1* | 6/2017 | Suzuki | B60R 21/213 |

FOREIGN PATENT DOCUMENTS

| | | |
|---|---|---|
| JP | 2016-537252 A | 12/2016 |
| JP | 2017-114250 A | 6/2017 |

* cited by examiner

VEHICLE CURTAIN AIRBAG DEVICE

CROSS-REFERENCE TO RELATED APPLICATION

This application claims priority under 35 USC 119 from Japanese Patent Application No. 2017-230585 filed on Nov. 30, 2017, the disclosure of which is incorporated by reference herein in its entirety.

BACKGROUND

Technical Field

The present disclosure relates to a vehicle curtain airbag device.

Related Art

A curtain bag body (i.e., a curtain airbag main body) that is provided with a main cell area, which is disposed underneath a roof side rail, and a sub-cell area, which is disposed underneath an A pillar (i.e., a front pillar) is disclosed in Japanese Unexamined Patent Application (JP-A) No. 2017-114250.

Additionally, in JP-A No. 2017-114250, a structure is employed in which, by folding the sub-cell area back towards a vehicle upper side, during inflation, the thickness of a front end portion of this curtain bag body increases.

If a structure is employed in which, during inflation, the thickness of a front end portion of a curtain airbag main body is increased, as is the case in JP-A No. 2017-114250, then it is possible to suppress the occurrence of Brain Rotational Injury Criterion (BrIC) in which the head portion of a vehicle occupant rotates around the axis of the neck portion thereof. However, if two airbags, namely, a main cell area and a sub-cell area are simply inflated adjacently to each other in a vehicle width direction, there is a possibility that it will not be possible to effectively push out the curtain airbag main body towards an inner side in the vehicle width direction, and there is room for improvement from the standpoint of enabling the risk of BrIC to be reduced with a high level of stability.

SUMMARY

In consideration of the above-described circumstances, an object of preferred embodiments is to provide a vehicle curtain airbag device that enables vehicle occupant protection capabilities to be maintained at a superior level.

A vehicle curtain airbag device of a first aspect of the disclosure is equipped to a vehicle having a front pillar garnish provided at a vehicle width direction inner side of a front pillar, and a roof head lining provided at a vehicle width direction inner side of a roof side rail. The vehicle curtain airbag device includes a curtain airbag main body that is configured to be stored between the front pillar and the front pillar garnish as well as between the roof side rail and the roof head lining so as to span across the front pillar and the roof side rail, and that, upon being supplied with gas, is inflated and deployed towards a vehicle lower side along a side window glass, a notch portion that is formed at the curtain airbag main body, and that, in a case in which the curtain airbag main body is in an inflated and deployed state, is configured to extend in a vehicle up-down direction at a vehicle front side of a boundary between the front pillar garnish and the roof head lining such that an upper portion of the curtain airbag main body is divided into front and rear sides by the notch portion, a connecting component that is configured to connect a front inflating portion at a vehicle front side of the notch portion of the curtain airbag main body to a vehicle main body, and that supports the front inflating portion such that, in an inflated and deployed state, the front inflating portion inflates at an outer side in the vehicle width direction of the front pillar garnish, and a holding component that holds the front pillar garnish such that the front pillar garnish is able to move in the vehicle width direction between an initial position where the front pillar garnish is located when the front inflating portion is in a pre-inflated state, and an inflation position where the front pillar garnish is located when the front inflating portion is in an inflated state, the inflation position is at an inner side in the vehicle width direction relative to the initial position.

In the vehicle curtain airbag device of the first aspect, a curtain airbag main body is stored between a front pillar and a front pillar garnish as well as between a roof side rail and a roof head lining so as to span across the front pillar and the roof side rail, and upon being supplied with gas, the curtain airbag main body is inflated and deployed towards a vehicle lower side along a side window glass. Additionally, a notch portion that extends in a vehicle up-down direction and divides an upper portion of the curtain airbag main body into front and rear sides is formed at the curtain airbag main body. Here, the notch portion is formed at a vehicle front side of a boundary between the front pillar garnish and the roof head lining when the curtain airbag main body is in an inflated and deployed state. Because of this, a front side portion of a portion at the vehicle rear side of the notch portion of the curtain airbag main body is disposed at a position that overlaps with the front pillar garnish when seen in a side view.

Moreover, a front inflating portion at a vehicle front side of the notch portion of the curtain airbag main body and a vehicle main body are connected by a connecting component, and the front inflating portion is inflated at an outer side in the vehicle width direction of the front pillar garnish. Here, the front pillar garnish is held by a holding component such that the front pillar garnish is able to move in the vehicle width direction. Because of this, when the front inflating portion inflates, the front pillar garnish is moved toward an inner side in the vehicle width direction from an initial position. As a consequence, the front side portion of the portion at the vehicle rear side of the notch portion can be made to move towards the inner side in the vehicle width direction, and the risk of BrIC can be reduced. In particular, by employing a structure in which the curtain airbag main body is moved towards the inner side in the vehicle width direction by the front pillar garnish, the curtain airbag main body can be pushed out by a surface at the inner side in the vehicle width direction of the pillar garnish.

In the vehicle curtain airbag device of a second aspect of the disclosure, in the first aspect, at least an upper portion of the connecting component is disposed at a position that overlaps with the front pillar garnish when seen in a vehicle side view when the curtain airbag main body is in the inflated and deployed state.

In the vehicle curtain airbag of the second aspect, compared with a structure in which an upper portion of the connecting component is disposed at a lower side of the front pillar garnish when seen in a vehicle side view, the front inflating portion can be more reliably held at the outer side in the vehicle width direction of the front pillar garnish, and the front inflating portion can be effectively inflated at the outer side in the vehicle width direction of the front pillar garnish.

A vehicle curtain airbag device of a third aspect of the disclosure, in the first aspect or the second aspect, further includes a gas supply path along which gas is supplied to the curtain airbag main body and that is provided at a rear inflating portion at a vehicle rear side of the notch portion at the curtain airbag main body, and a non-inflating portion is provided at a lower side of the boundary between the front pillar garnish and the roof head lining at the curtain airbag main body in the case in which the curtain airbag main body is in the inflated and deployed state.

In the vehicle curtain airbag device of the third aspect, a gas supply path is provided at a rear inflating portion of the curtain airbag main body. Additionally, a non-inflating portion is provided at a lower side of the boundary between the front pillar garnish and the roof head lining at the curtain airbag main body. As a consequence, the rear inflating portion of the curtain airbag main body inflates slightly earlier than the front inflating portion thereof. As a result, the rear inflating portion can be deployed at the inner side in the vehicle width direction of the front pillar garnish before the front inflating portion is inflated and the front pillar garnish is consequently moved towards the inner side in the vehicle width direction.

A vehicle curtain airbag device of a fourth aspect of the disclosure, in the first aspect or the second aspect, further includes a gas supply path along which gas is supplied to the curtain airbag main body and that is provided at a rear inflating portion at a vehicle rear side of the notch portion at the curtain airbag main body, and a non-inflating portion is provided extending from a lower end of the notch portion towards a vehicle rear side and a vehicle lower side.

In the vehicle curtain airbag device of the fourth aspect, a non-inflating portion is provided extending from a lower end of the notch portion towards a vehicle rear side and a vehicle lower side. Because of this, as a result of the front inflating portion and the rear inflating portion only being in mutual communication via the lower side of the non-inflating portion, compared with a structure in which the front inflating portion and the rear inflating portion are in mutual communication via both the upper and lower sides of the non-inflating portion, a time difference between a time when the inflation of the front inflating portion is completed and a time when the inflation of the rear inflating portion is completed can be increased.

In the vehicle curtain airbag device of a fifth aspect of the disclosure, in any one of the first through fourth aspects, the holding component is formed so as to include an elastically deformable shaft portion whose one end portion is fixed to the front pillar, and whose another end portion is inserted into a mounting seat that is formed at the front pillar garnish, and an anchor portion that is formed at the other end portion of the shaft portion and that can be anchored to the mounting seat.

In the vehicle curtain airbag device of the fifth aspect of the present disclosure, during the inflation of the front inflating portion, as a result of the anchor portion formed at a distal end of the shaft portion being anchored to the mounting seat, movement of the front pillar garnish in the vehicle width direction can be restricted.

As has been described above, according to the vehicle curtain airbag device of the first aspect, the excellent effect is demonstrated that a superior vehicle occupant protection capability can be maintained.

According to the vehicle curtain airbag device of the second aspect, the excellent effect is demonstrated that the front pillar garnish can be reliably moved towards the inner side in the vehicle width direction.

According to the vehicle curtain airbag device of the third aspect, the excellent effect is demonstrated that the rear inflating portion can be moved with stability towards the inner side in the vehicle width direction.

According to the vehicle curtain airbag device of the fourth aspect, the excellent effect is demonstrated that, compared with a structure in which a front inflating portion and a rear inflating portion are in mutual communication via both upper and lower sides of the non-inflating portion, the rear inflating portion can be moved with even more stability towards the inner side in the vehicle width direction.

According to the vehicle curtain airbag device of the fifth aspect, the excellent effect is demonstrated that the front pillar garnish can be held in such a way that it can be moved in the vehicle width direction by means of a simple structure.

BRIEF DESCRIPTION OF THE DRAWINGS

Preferred embodiments will be described in detail based on the following figures, wherein.

DETAILED DESCRIPTION

First Embodiment

Hereinafter, a vehicle curtain airbag device 10 according to a first exemplary embodiment will be described with reference to the drawings. Note that an arrow FR, an arrow UP, and an arrow RH that are shown in the appropriate drawings respectively indicate a vehicle forward direction, a vehicle upward direction, and a vehicle right-hand side. Hereinafter, if front-rear, left-right, or up-down directions are used in the following description, then, unless specifically stated otherwise, these refer respectively to front-rear directions of the vehicle, left-right directions in a vehicle width direction, and up-down directions of the vehicle.

(Overall Structure of a Curtain Airbag Device)

Figure 1:
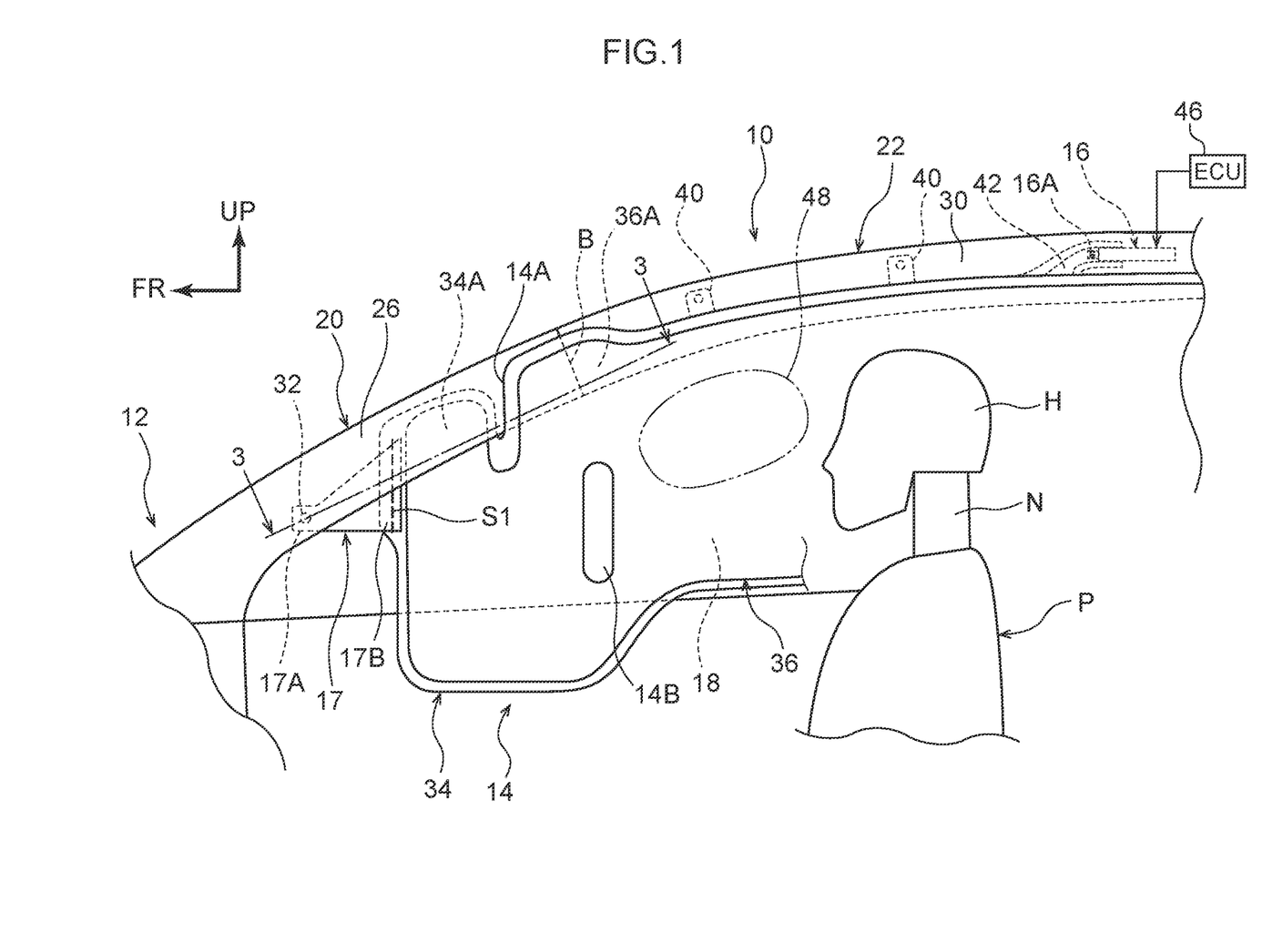
FIG. 1 is a side view as seen from inside a vehicle cabin of a vehicle curtain airbag device according to a first exemplary embodiment, and shows an inflated and deployed state of a curtain airbag main body.

As is shown in FIG. 1, the vehicle curtain airbag device 10 is a vehicle occupant protection device that is mounted in a vehicle 12, and is formed so as to include a curtain airbag main body 14, an inflator 16, and a triangular strap 17 that serves as a connecting component. Upon being supplied with gas from the inflator 16, the curtain airbag main body 14 is inflated and deployed towards a vehicle lower side along side window glass 18.

Figure 2:
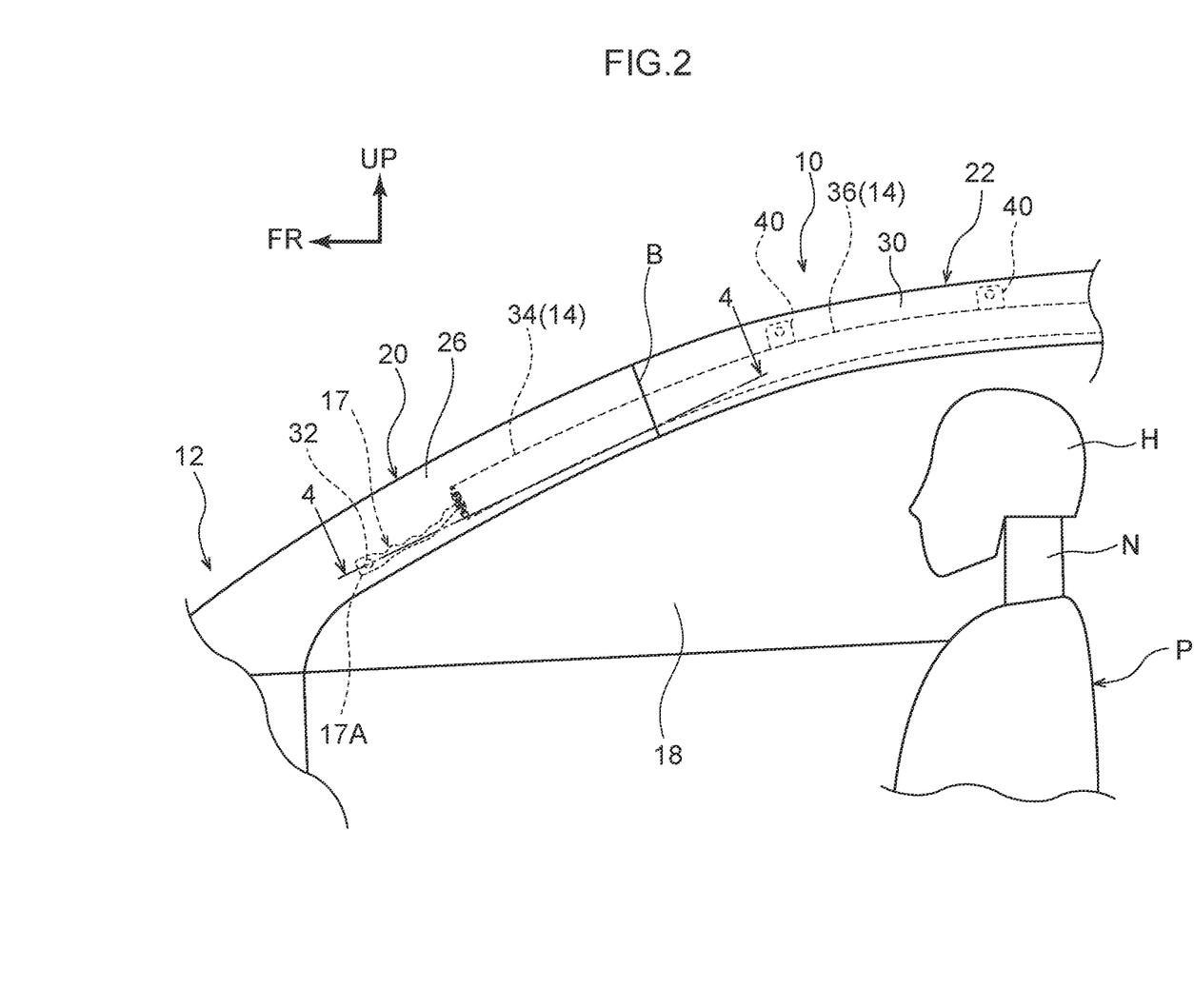
FIG. 2 is a side view as seen from inside a vehicle cabin of a vehicle curtain airbag device according to the first exemplary embodiment, and shows a state prior to an inflation of a curtain airbag main body.

Prior to being inflated and deployed, as is shown in FIG. 2, this curtain airbag main body 14 is formed into an elongated shape by being folded into a roll, and is housed together with the inflator 16 so as to span across a front pillar 20 and a roof side rail 22 that are provided at an upper end portion of a vehicle cabin side portion.

Figure 4:
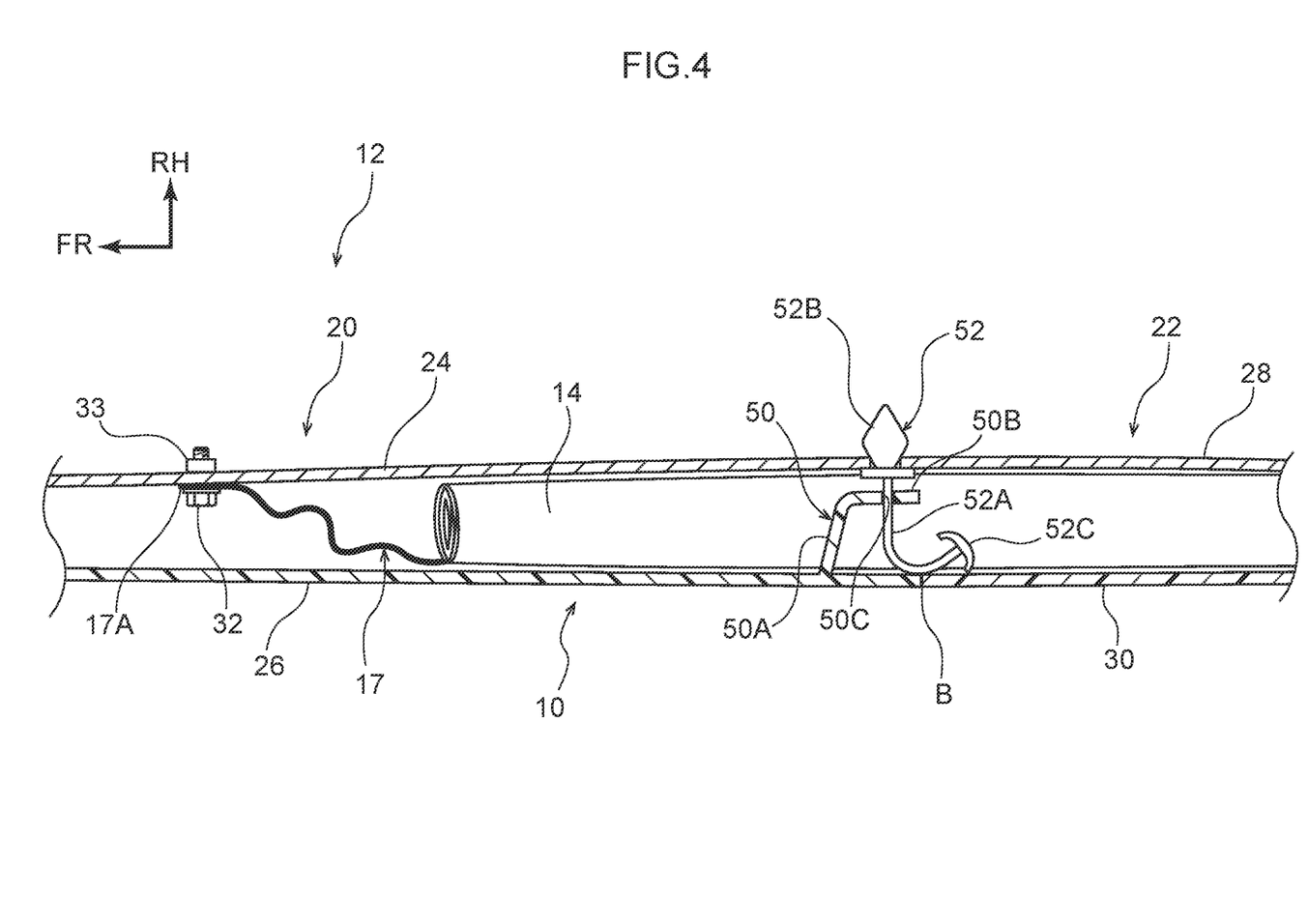
FIG. 4 is a cross-sectional view showing an enlargement of a state across a line 4-4 in FIG. 2.

The front pillar 20 is a frame component whose vehicle front portion extends in the vehicle up-down direction and, as is shown in FIG. 4, is formed so as to include a front pillar inner panel 24 (hereinafter, referred to where appropriate as a 'pillar inner panel 24'), and a front pillar outer panel (not shown in the drawings) (hereinafter, referred to where appropriate as a 'pillar outer panel).

The pillar inner panel 24 is formed from steel plate and forms an inner side portion in the vehicle width direction of the frame component. The pillar outer panel (not shown in the drawings) is disposed at an outer side in the vehicle width direction of the pillar inner panel 24. The pillar inner panel 24 and the pillar outer panel are joined together so as to form a closed cross-section.

The front pillar 20 is covered from the vehicle cabin interior side by a front pillar garnish 26 (hereinafter, referred to where appropriate as a 'pillar garnish 26'). The pillar garnish 26 is an interior finishing material that is formed from resin and is disposed at the inner side in the vehicle width direction of the pillar inner panel 24. The curtain airbag main body 14 is housed in a folded state between the pillar inner panel 24 and the pillar garnish 26. Note that a front end portion of the pillar garnish 26 is inserted into a mounting hole in an instrument panel in the same way as in a commonly known structure.

Moreover, a mounting seat 50, in which is anchored a tether clip 52 that is serving as a holding component, is formed at the pillar garnish 26. The mounting seat 50 is formed so as to include a horizontal wall portion 50A that extends towards the outer side in the vehicle width direction from the pillar garnish 26, and a vertical wall portion 50B that extends towards a vehicle rear side from a distal end portion of the horizontal wall portion 50A. An insertion hole 50C is formed at the vertical wall portion 50B. A shaft portion 52A of the tether clip 52 is inserted through this insertion hole 50C.

The tether clip 52 is formed so as to include the shaft portion 52A, a fixed portion 52B, and an anchor portion 52C. The shaft portion 52A is an elongated portion, and is formed so as to be elastically deformable. The fixed portion 52B is provided at one end portion of the shaft portion 52A, and this fixed portion 52B is fixed to the pillar inner panel 24. In contrast, the anchor portion 52C is provided at another end portion of the shaft portion 52A. The anchor portion 52C is formed at an end portion of the shaft portion 52A that is inserted through the mounting seat 50, and is formed large enough that it can be anchored in the mounting seat 50.

Figure 3:
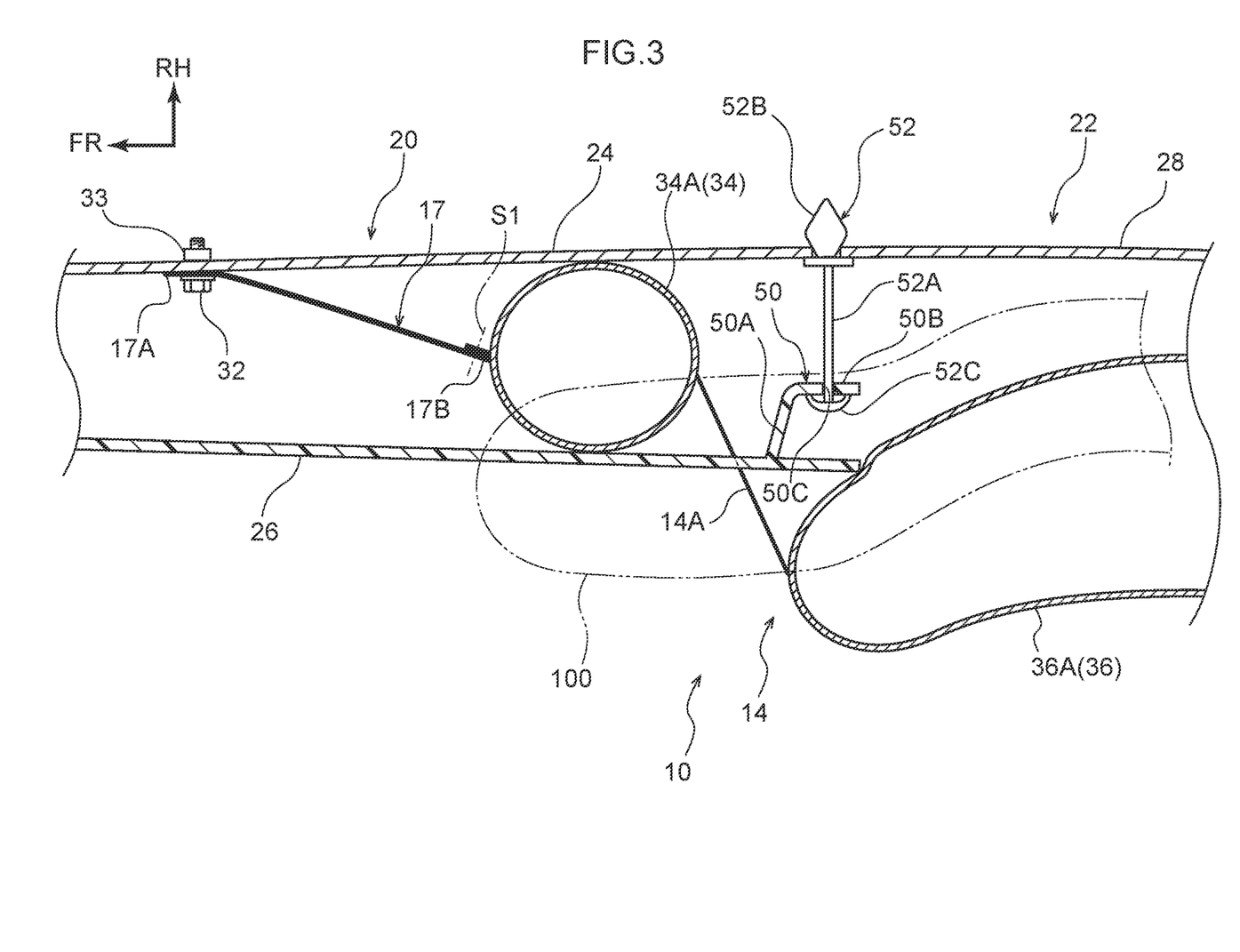
FIG. 3 is a cross-sectional view showing an enlargement of a state across a line 3-3 in FIG. 1.

Here, as is shown in FIG. 4, when the curtain airbag main body 14 is in a pre-inflated and deployed state, because there is only a narrow space between the pillar inner panel 24 and the pillar garnish 26, the distal end side of the shaft portion 52A of the tether clip 52 comes up against the pillar garnish 26 and is bent backwards (i.e., is elastically deformed). As is shown in FIG. 3, when the curtain airbag main body 14 is inflated and deployed, because a front inflating portion 34 (described below) inflates between the pillar inner panel 24 and the pillar garnish 26, the space between the pillar inner panel 24 and the pillar garnish 26 is pushed wider. As a consequence, the pillar garnish 26 is moved towards the inner side in the vehicle width direction as far as a position where the anchor portion 52C of the tether clip 52 is anchored by the mounting seat 50.

As is shown in FIG. 4, the roof side rail 22 is a frame component that extends in the vehicle front-rear direction in an upper portion of the vehicle 12, and is formed so as to include a rail inner panel 28 and a rail outer panel (not shown in the drawings). The rail inner panel 28 is formed from steel plate and forms an inner side portion in the vehicle width direction of the frame component. A rail outer panel (not shown in the drawings) is disposed at the outer side in the vehicle width direction of this rail inner panel 28. The rail inner panel 28 and the rail outer panel are joined together so as to form a closed cross-section.

Furthermore, the roof side rail 22 is covered from the vehicle cabin interior side by a roof head lining 30. The curtain airbag main body 14 is housed in a folded state between the roof side rail 22 and the roof head lining 30.

As is shown in FIG. 1, a boundary between the pillar garnish 26 and the roof head lining 30 is formed as a break line B. The pillar garnish 26 is disposed at the vehicle front side of the break line B, while the roof head lining 30 is disposed at the vehicle rear side of the break line B.

The curtain airbag main body 14 is formed in a bag shape, for example, by two pieces of base fabric that are formed by cutting them out of a nylon-based or polyester-based cloth material, and that are then mutually superimposed on each other, and have their outer peripheral edge portions sewn together. Note that the method used to manufacture the curtain airbag main body 14 is not limited to the one described above, and it is also possible to hollow-weave the curtain airbag main body 14 as a single unit using a One Piece Woven method.

A notch portion 14A is formed at an upper portion of the curtain airbag main body 14. The curtain airbag main body 14 is formed so as to include the front inflating portion 34 that is located at the vehicle front side of this notch portion 14A, and a rear inflating portion 36 that is located at the vehicle rear side of the notch portion 14A.

The notch portion 14A extends in the vehicle up-down direction at the vehicle front side of the break line B (i.e. of the boundary between the front pillar garnish 26 and the roof head lining 30) when the curtain airbag main body 14 is in an inflated and deployed state. An upper portion of the curtain airbag main body 14 is divided into front and rear parts by this notch portion 14A. Moreover, the notch portion 14A of the present exemplary embodiment is formed extending from an upper end portion of the curtain airbag main body 14 to slightly below a lower end of the pillar garnish 26. Because of this, the front inflating portion 34 and the rear inflating portion 36 are in mutual communication with each other at the lower side of the notch portion 14A.

The front inflating portion 34 forms a front portion of the curtain airbag main body 14, and the triangular strap 17 is attached to an upper portion of the front inflating portion 34. The triangular strap 17 is a belt-shaped component that is formed substantially in a triangular shape when seen in a vehicle side view. As is shown in FIG. 3 and FIG. 4, a front end portion 17A of the triangular strap 17 is fastened to the pillar inner panel 24 by means of a bolt 32 and a weld nut 33. Moreover, as is shown in FIG. 1, a rear portion 17B of the triangular strap 17 is sewn (via a sewn portion S1) to an upper end portion of the front inflating portion 34 of the curtain airbag main body 14. In this way, the front inflating portion 34 is connected to the pillar inner panel 24 (i.e., to the vehicle main body) by the triangular strap 17.

Moreover, at least an upper portion of the triangular strap 17 is disposed at a position where it overlaps with the pillar garnish 26. As an example, in the present exemplary embodiment, apart from a portion of the rear end portion and of the lower end portion of the triangular strap 17, the remainder of the triangular strap 17 is disposed at a position that overlaps with the pillar garnish 26.

Here, as is shown in FIG. 2 and FIG. 4, when the curtain airbag main body 14 is in a pre-inflated and deployed state, the triangular strap 17 hangs loosely. In contrast, as is shown in FIG. 1 and FIG. 3, when the curtain airbag main body 14 is in an inflated and deployed state, as a result of the triangular strap 17 being pulled, tension is applied to the front inflating portion 34 towards a pillar inner panel 24 side. Because of this, a structure is formed in which the (upper portion 34A of the) front inflating portion 34 is held within the space between the pillar inner panel 24 and the pillar garnish 26, and is inflated within this space.

As is shown in FIG. 1, the rear inflating portion 36 is provided at the vehicle rear side of the front inflating portion 34 so as to sandwich the notch portion 14A between them. The rear inflating portion 36 extends as far as a rear seat (not shown in the drawings). Here, the upper portion 36A of the rear inflating portion 36 is formed so as to inflate and deploy at the inner side in the vehicle width direction of the pillar garnish 26 and at the inner side in the vehicle width direction of the roof head lining 30. Because of this, the curtain airbag main body 14 is inflated and deployed in the vehicle width direction such that the notch portion 14A spans across the pillar garnish 26 (see FIG. 3).

Plural tabs 40 are provided in a row running in the vehicle front-rear direction at an upper edge portion of the rear inflating portion 36. The plurality of tabs 40 are formed, for example, from the same type of cloth material as the base fabric forming the curtain airbag main body 14, and extend towards the vehicle upper side from the upper edge portion of the rear inflating portion 36. These tabs 40 are fastened to the rail inner panel 28 of the roof side rail 22 by means of bolts and weld nuts (not shown in the drawings).

Furthermore, a non-inflating portion 14B that does not inflate is provided at a front portion of the rear inflating portion 36. The non-inflating portion 14B is provided at the vehicle lower side of the break line B when the curtain airbag main body 14 is in an inflated and deployed state, and extends in the vehicle up-down direction. Because of this, gas that is supplied from the inflator 16 to the rear inflating portion 36 flows at an upper side of the non-inflating portion 14B and at the lower side of the non-inflating portion 14B, and is then supplied to the front inflating portion 34. Note that an area enclosed by a double-dot chain line 48 which is shown in the rear inflating portion 36 in FIG. 1 is an area where a head portion H of a vehicle occupant P is restrained in the event of a diagonal collision.

At an upper end portion of the rear inflating portion 36, a gas supply path 42 extends from a vehicle rear side of the seating position of the vehicle occupant P towards the vehicle upper side and the vehicle front side. This gas supply path 42 is positioned at the outer side in the vehicle width direction of the roof head lining 30, and is connected to the inflator 16.

The inflator 16 is what is known as a cylinder-type inflator, and is fixed to the roof side rail 22 in such a way that an axial direction thereof extends in the vehicle front-rear direction. Additionally, a gas injection portion 16A is provided at a front end portion of the inflator 16, and a plurality of injection nozzles are formed in this gas injection portion 16A. When the inflator 16 is operated, gas is discharged from the gas injection portion 16A and passes along the gas supply path 42 so as to be supplied to the curtain airbag main body 14.

The inflator 16 is electrically connected to an ECU (Electronic Control Unit) 46. The ECU 46 is electrically connected to side impact sensors, roll-over sensors, and diagonal impact sensors (none of these are shown in the drawings). The side impact sensors are formed such that they predict or detect an (unavoidable) side impact on the vehicle 12, and output a signal to the ECU 46. The roll-over sensors are formed such that they predict or detect an (unavoidable) roll-over of the vehicle 12, and output a signal to the ECU 46. Moreover, the diagonal impact sensors are formed such that they predict or detect an (unavoidable) diagonal impact on the vehicle 12, and output a signal to the ECU 46. Note that, in the present exemplary embodiment, a diagonal impact (i.e., also k known as an MDB impact or an oblique impact) is an impact from a diagonally forward direction as stipulated by, for example, NHTSA (as an example, an impact in which the relative angle with the other vehicle in the collision is approximately 15°, and the amount of overlap in the vehicle width direction is approximately 35%). In the present exemplary embodiment, as an example, a diagonal collision at a relative speed of 90 km/hr is assumed.

When the inflator 16 is operated by the ECU 46, gas is supplied from the gas injection portion 16A of the inflator 16 through the gas supply path 42 to the rear inflating portion 36 of the curtain airbag main body 14. As a result, the rear inflating portion 36 is inflated, and is deployed towards the vehicle lower side along the side window glass 18 while pushing a terminal portion of the roof head lining 30 in a downward direction.

A portion of the gas supplied to the rear inflating portion 36 flows either at the upper side or the lower side of the non-inflating portion 14B and is supplied to the front inflating portion 34, thereby causing the front inflating portion 34 to inflate. Because of this, the front inflating portion 34 is inflated slightly later than the rear inflating portion 36. Here, as is described above, because the upper portion 34A of the front inflating portion 34 is connected to the pillar inner panel 24 by means of the triangular strap 17, as is shown in FIG. 3, the front inflating portion 34 is inflated within the space between the pillar inner panel 24 and the pillar garnish 26. As a consequence, the pillar garnish 26 moves in the vehicle width direction from an initial position, which is shown in FIG. 4, to an inflation position, which is shown in FIG. 3.

Because the upper portion 36A of a front end portion of the rear inflating portion 36 is deployed at the inner side in the vehicle width direction of the pillar garnish 26, this upper portion 36A is moved towards the inner side in the vehicle width direction in conjunction with the movement of the pillar garnish 26. The head portion H of the vehicle occupant P is restrained by the portion of the rear inflating portion 36 that has moved towards the inner side in the vehicle width direction. Note that, although not shown in the drawings, a head-on collision airbag (i.e., a driver's side airbag) is inflated and deployed in front of the vehicle occupant P.

(Actions and Effects)

Next, actions and effects of the present exemplary embodiment will be described.

In the vehicle curtain airbag device 10 according to the present exemplary embodiment, as is shown in FIG. 1, when the curtain airbag main body 14 is in an inflated and deployed state, because the upper portion 36A of the front end portion of the rear inflating portion 36 moves towards the inner side in the vehicle width direction, the risk of BrIC is reduced. This action will now be described in comparison with a structure of a comparative example in which the notch portion 14A and the triangular strap 17 are not provided.

In FIG. 3, a curtain airbag main body 100 of the comparative example is shown by a double-dot chain line. The curtain airbag main body 100 of this comparative example has a similar structure to the curtain airbag main body 14 of the present exemplary embodiment apart from the fact that the notch portion 14A is not formed therein. Because the curtain airbag main body 100 of the comparative example is not connected to the vehicle main body by the triangular strap 17, it does not remain and inflate between the pillar inner panel 24 and the pillar garnish 26, and is not inflated and deployed at the inner side in the vehicle width direction of the pillar garnish 26. Here, in the comparative example, because the pillar garnish 26 does not move towards the inner side in the vehicle width direction, the curtain airbag main body 100 is inflated and deployed at the position shown by the double-dot chain line in FIG. 3.

In contrast to this, in the present exemplary embodiment, as is described above, the pillar garnish 26 is moved towards the inner side in the vehicle width direction as a result of the front inflating portion 34 being inflated. Because of this, the rear inflating portion 36 is moved towards the inner side in the vehicle width direction by the pillar garnish 26 which is moved, so that the curtain airbag main body 14 can be made to inflate and deploy further to the inner side in the vehicle width direction than the curtain airbag main body 100 of the comparative example.

Here, it is known that, by causing the curtain airbag main body 14 to inflate and deploy at the inner side in the vehicle width direction, the risk of Brain Rotational Injury Criterion (BrIC), in which the head portion H is rotated around the axis of the neck portion N, occurring can be reduced. In other words, as is the case in the present exemplary embodiment, by causing the curtain airbag main body 14 to inflate and deploy further to the inner side in the vehicle width direction than the curtain airbag main body 100 of the comparative example, the risk of BrIC is reduced.

In particular, if a structure is employed in which the curtain airbag main body 14 is moved towards the inner side in the vehicle width direction by the pillar garnish 26, then the curtain airbag main body 14 can be pushed towards the inner side in the vehicle width direction with more consistency than when a structure in which two airbags are arranged side-by-side in the vehicle width direction is employed. For example, in a structure in which a curtain airbag main body is pushed towards the inner side in the vehicle width direction by a separate airbag being inflated at the outer side in the vehicle width direction of the curtain airbag main body, then if the deployment position of the separate airbag becomes shifted or the like, there are cases when the curtain airbag main body does not get pushed as far as the desired position. In contrast to this, in the structure in which the curtain airbag main body 14 is pushed by using the pillar garnish 26, there is no shifting of the position of the pillar garnish 26, and the curtain airbag main body 14 can be pushed by the surface at the inner side in the vehicle width direction of the pillar garnish 26. Because of this, the curtain airbag main body 14 can be moved with greater stability towards the inner side in the vehicle width direction. As a result, a superior vehicle occupant protection capability can be maintained. Moreover, compared with a structure in which the curtain airbag main body is formed so as to be thicker overall in the vehicle width direction, any increase in the volume of the curtain airbag main body can be held to a minimum, and there is no need for the size of the inflator 16 to be increased. Additionally, any increase in the size of the space where the curtain airbag main body is housed can also be suppressed.

Moreover, in the present exemplary embodiment, as is shown in FIG. 1, at least the upper portion of the triangular strap 17 is disposed at a position where it overlaps with the pillar garnish 26. As a consequence, compared with a structure in which the upper portion of the triangular strap 17 is disposed at the lower side of the pillar garnish 26 when seen in a vehicle side view, the front inflating portion 34 can be held at the outer side in the vehicle width direction of the front pillar garnish. As a result, the front inflating portion 34 can be effectively inflated at the outer side in the vehicle width direction of the pillar garnish 26.

Furthermore, in the present exemplary embodiment, a structure is employed in which the gas supply path 42 is provided at the rear inflating portion 36, and the non-inflating portion 14B is provided at the lower side of the break line B. As a consequence, in the curtain airbag main body 14, the rear inflating portion 36 inflates slightly earlier than the front inflating portion 34. As a result, the rear inflating portion 36 can be deployed at the inner side in the vehicle width direction of the pillar garnish 26 prior to the front portion 34 inflating and the pillar garnish 26 moving towards the inner side in the vehicle width direction. As a result, the rear inflating portion 36 can be moved towards the inner side in the vehicle width direction with greater stability.

Furthermore, in the present exemplary embodiment, as is shown in FIG. 3, the pillar garnish 26 is held so as to be able to move in the vehicle width direction by the tether clip 52 in which the anchor portion 52C is formed at the distal end portion of the shaft portion 52A. As a consequence, when the front inflating portion 34 is inflating, because the anchor portion 52C is anchored to the mounting seat 50, movement of the pillar garnish 26 in the vehicle width direction can be restricted. In this way, the pillar garnish 26 can be held in such a way that it is able to move in the vehicle width direction by means of a simple structure.

Second Embodiment

Next, a vehicle curtain airbag device 60 according to a second exemplary embodiment will be described with reference to FIG. 5. Note that component elements that are the same as in the first exemplary embodiment are given the same descriptive symbols and any description thereof is omitted when appropriate.

Figure 5:
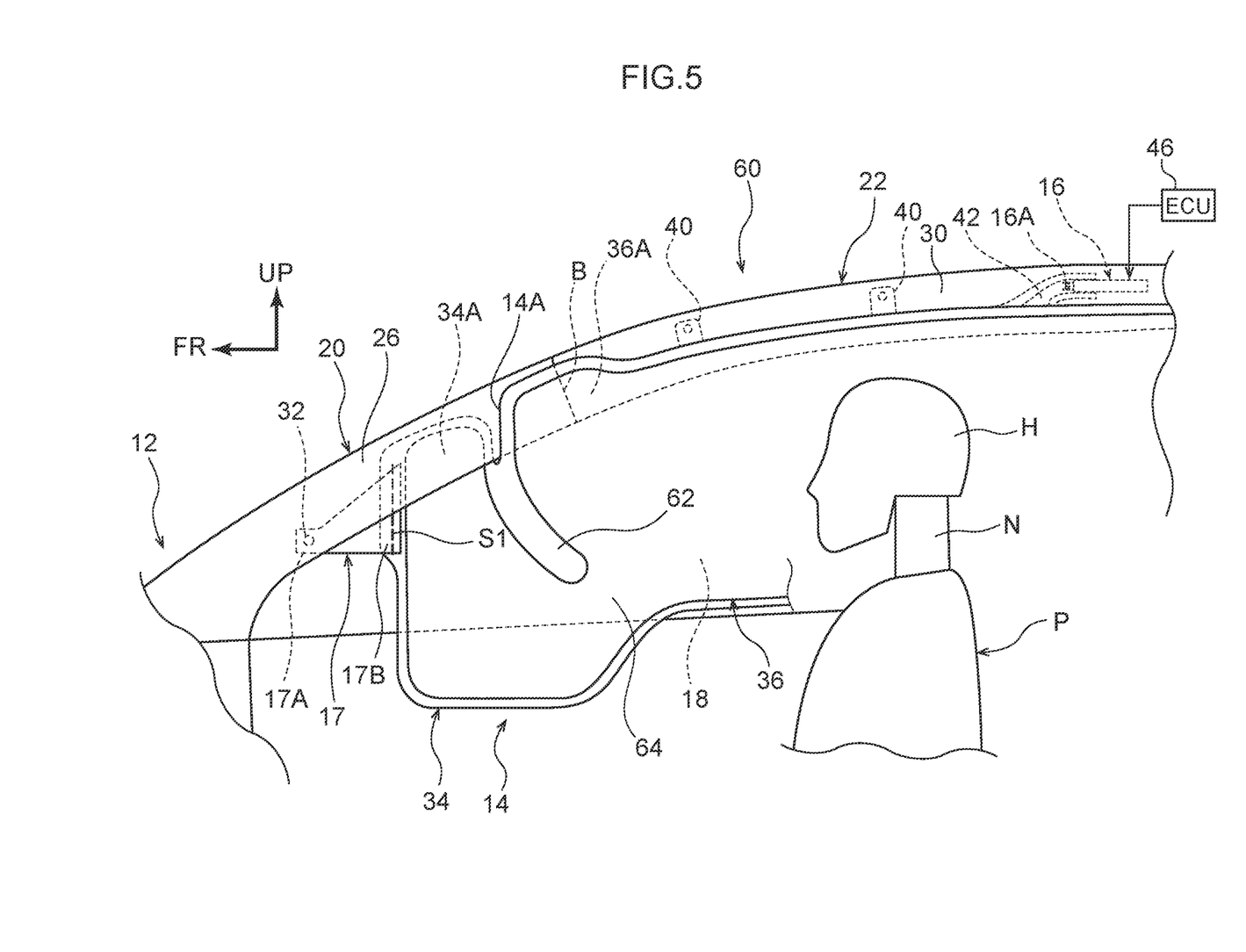
FIG. 5 is a side view as seen from inside a vehicle cabin of a vehicle curtain airbag device according to a second exemplary embodiment, and shows an inflated and deployed state of a curtain airbag main body.

As is shown in FIG. 5, the curtain airbag main body 14 forming part of the vehicle curtain airbag device 60 according to the present exemplary embodiment is provided with a non-inflating portion 62 instead of the non-inflating portion 14B, while the remainder of the structure is the same as in the first exemplary embodiment. In other words, the upper portion of the curtain airbag main body 14 is divided by the notch portion 14A into the front inflating portion 34 and the rear inflating portion 36, and the triangular strap 17 is sewn to the front inflating portion 34. In addition, the gas supply path 42 is provided in the rear inflating portion 36, and gas generated from the inflator 16 is supplied via the gas supply path 42.

Here, the non-inflating portion 62 is formed so as to continue on from the lower end of the notch portion 14A, and the non-inflating portion 62 is provided extending from the lower end of the notch portion 14A towards the vehicle rear side and the vehicle downward side. More specifically, the non-inflating portion 62 is curved such that a lower end side thereof is positioned further to the vehicle rear side than an upper end side thereof. Additionally, because the front inflating portion 34 and the rear inflating portion 36 are separated into the front and rear portions by the notch portion 14A and the non-inflating portion 62, the front inflating portion 34 is formed substantially in a triangular shape when seen in a vehicle side view such that a lower portion thereof is longer in the vehicle front-rear direction than an upper portion thereof. Moreover, a communicating portion 64 that enables the front inflating portion 34 and the rear inflating portion 36 to be in mutual communication is provided between a lower end portion of the non-inflating portion 62 and the lower end portion of the curtain airbag main body 14. Because of this, a structure is created in which a portion of the gas, that is supplied from the inflator 16 through the gas supply path 42 to the rear inflating portion 36, is supplied to the front inflating portion 34 via the communicating portion 64. Note that the non-inflating portion 62 may be provided, for example, at a position that corresponds to a head-on collision airbag (i.e., a driver's side airbag not shown in the drawings), or the configuration of the curvature of the non-inflating portion 62 may be set so as to correspond to an inclination of a restraining surface of the head-on collision airbag when seen in a vehicle side view.

(Actions and Effects)

Next, actions and effects of the present exemplary embodiment will be described.

According to the vehicle curtain airbag device 60 according to the present exemplary embodiment, because the non-inflating portion 62 is provided extending from the lower end of the notch portion 14A towards the vehicle rear side and the vehicle downward side, the front inflating portion 34 and the rear inflating portion 36 are in mutual communication solely via the communicating portion 64 at the lower side of the non-inflating portion 62. As a consequence, compared with a structure in which the front inflating portion 34 and the rear inflating portion 36 are in mutual communication on both the upper and lower sides of the non-inflating portion 14B, as is the case in the first exemplary embodiment, the time difference between when the inflation of the front inflating portion 34 is completed and when the inflation of the rear inflating portion 36 is completed can be increased. As a result, the rear inflating portion 36 can be reliably deployed at the inner side in the vehicle width direction of the pillar garnish, and the rear inflating portion 36 can be moved with greater stability towards the inner side in the vehicle width direction. The remaining actions are the same as those of the first exemplary embodiment.

Vehicle curtain airbag devices according to the first exemplary embodiment and the second exemplary embodiment have been described above, however, various modifications and the like may be made thereto insofar as they do not depart from the scope of the present disclosure. For example, in the above-described exemplary embodiments, the triangular strap 17 is provided as a connecting component, and the front inflating portion 34 and the pillar inner panel 24 are connected together by means of this triangular strap 17, however, the present disclosure is not limited to this. In other words, it is also possible to provide a string-shaped component or an elongated belt-shaped component as the connecting component instead of the triangular strap 17.

Moreover, in the above-described exemplary embodiments, as is shown in FIG. 3 and FIG. 4, the tether clip 52 is used as a holding component, however, the present disclosure is not limited to this, and it is also possible to use a different holding component. For example, a string-shaped component may instead be used as the holding component. In this case, one end portion of the string-shaped holding component is fixed to the pillar inner panel 24, and the other end of the string-shaped component is inserted through the insertion hole 50C in the mounting seat 50. By providing an anchoring portion having a larger diameter than that of the insertion hole 50C on a distal end of the inserted string-shaped component, the same effects as those obtained from the tether clip 52 can be achieved.

What is claimed is:

1. A vehicle curtain airbag device equipped to a vehicle having a front pillar garnish provided at a vehicle width direction inner side of a front pillar, and a roof head lining provided at a vehicle width direction inner side of a roof side rail, the vehicle curtain airbag device comprising:
    a curtain airbag main body configured to be stored between the front pillar and the front pillar garnish as well as between the roof side rail and the roof head lining so as to span across the front pillar and the roof side rail, and, upon being supplied with gas, inflated and deployed towards a vehicle lower side along a side window glass;
    a notch portion formed at the curtain airbag main body, and in a case in which the curtain airbag main body is in an inflated and deployed state, configured to extend in a vehicle up-down direction at a vehicle front side of a boundary between the front pillar garnish and the roof head lining such that an upper portion of the curtain airbag main body is divided into front and rear sides by the notch portion;
    a connecting component configured to connect a front inflating portion at a vehicle front side of the notch portion of the curtain airbag main body to a vehicle main body, and supporting the front inflating portion such that, in an inflated and deployed state, the front inflating portion inflates at an outer side in the vehicle width direction of the front pillar garnish;
    a holding component holding the front pillar garnish such that the front pillar garnish is able to move in the vehicle width direction between an initial position where the front pillar garnish is located when the front inflating portion is in a pre-inflated state, and an inflation position where the front pillar garnish is located when the front inflating portion is in an inflated state, the inflation position being at an inner side in the vehicle width direction relative to the initial position; and
    a non-inflating portion is provided extending from a lower end of the notch portion towards a vehicle rear side and a vehicle lower side.

2. The vehicle curtain airbag device according to claim 1, wherein at least an upper portion of the connecting component is disposed at a position that overlaps with the front pillar garnish when seen in a vehicle side view in the case in which the curtain airbag main body is in the inflated and deployed state.

3. The vehicle curtain airbag device according to claim 2, wherein:
    a gas supply path along which gas is supplied to the curtain airbag main body is provided at a rear inflating portion at a vehicle rear side of the notch portion at the curtain airbag main body.

4. The vehicle curtain airbag device according to claim 1, wherein the holding component is formed so as to include an elastically deformable shaft portion with one end portion that is fixed to the front pillar, and with another end portion that is inserted into a mounting seat that is formed at the front pillar garnish, and an anchor portion that is formed at the other end portion of the shaft portion and that can be anchored to the mounting seat.

5. A vehicle curtain airbag device equipped to a vehicle having a front pillar garnish provided at a vehicle width direction inner side of a front pillar, and a roof head lining provided at a vehicle width direction inner side of a roof side rail, the vehicle curtain airbag device comprising:
- a curtain airbag main body configured to be stored between the front pillar and the front pillar garnish as well as between the roof side rail and the roof head lining so as to span across the front pillar and the roof side rail, and, upon being supplied with gas, inflated and deployed towards a vehicle lower side along a side window glass;
- a notch portion formed at the curtain airbag main body, and in a case in which the curtain airbag main body is in an inflated and deployed state, configured to extend in a vehicle up-down direction at a vehicle front side of a boundary between the front pillar garnish and the roof head lining such that an upper portion of the curtain airbag main body is divided into front and rear sides by the notch portion;
- a connecting component configured to connect a front inflating portion at a vehicle front side of the notch portion of the curtain airbag main body to a vehicle main body, and supporting the front inflating portion such that, in an inflated and deployed state, the front inflating portion inflates at an outer side in the vehicle width direction of the front pillar garnish;
- a holding component holding the front pillar garnish such that the front pillar garnish is able to move in the vehicle width direction between an initial position where the front pillar garnish is located when the front inflating portion is in a pre-inflated state, and an inflation position where the front pillar garnish is located when the front inflating portion is in an inflated state, the inflation position being at an inner side in the vehicle width direction relative to the initial position;
- a gas supply path along which gas is supplied to the curtain airbag main body is provided at a rear inflating portion at a vehicle rear side of the notch portion at the curtain airbag main body, and
- a non-inflating portion is provided extending from a lower end of the notch portion towards a vehicle rear side and a vehicle lower side.

\* \* \* \* \*